United States Patent
Shiino

(10) Patent No.: US 6,452,936 B1
(45) Date of Patent: Sep. 17, 2002

(54) SPREAD-SPECTRUM COMMUNICATION APPARATUS WITH ADAPTIVE FRAME CONFIGURATION

(75) Inventor: Haruhiro Shiino, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 0 days.

(21) Appl. No.: 09/170,116

(22) Filed: Oct. 13, 1998

(30) Foreign Application Priority Data

Nov. 17, 1997 (JP) .............................. 9-315580

(51) Int. Cl.[7] ................................ H04J 13/00
(52) U.S. Cl. .................. 370/441; 370/320; 370/335; 370/342; 370/468
(58) Field of Search ................. 370/320, 335, 370/342, 441, 278, 282, 468, 470; 375/140, 141, 142, 143, 146, 147, 152; 455/63, 78

(56) References Cited

U.S. PATENT DOCUMENTS 5,490,136 A * 2/1996 Sereno et al. ............... 370/468
5,673,266 A * 9/1997 Li ................................ 370/465
5,857,147 A * 1/1999 Gardner et al. ............. 370/468

OTHER PUBLICATIONS

Sereno et al., Variable–Rate for the Basic Speech Service in UMTS, IEEE, pp. 520–523, 1993.*

* cited by examiner

Primary Examiner—Wellington Chin
Assistant Examiner—Frank Duong
(74) Attorney, Agent, or Firm—Venable; Michael A. Sartori

(57) ABSTRACT

A spread-spectrum communication apparatus transmits and receives packets of data preceded by reference signals used in demodulating the packets of data. A control unit in the communication apparatus estimates channel conditions, and varies the length of the transmitted packets, hence the intervals between reference signals, using longer packets under better channel conditions. Configuration information indicating the packet length may also be transmitted. Excessive overhead can thus be avoided without impairing the accuracy of channel estimates used in demodulating the received data.

12 Claims, 4 Drawing Sheets

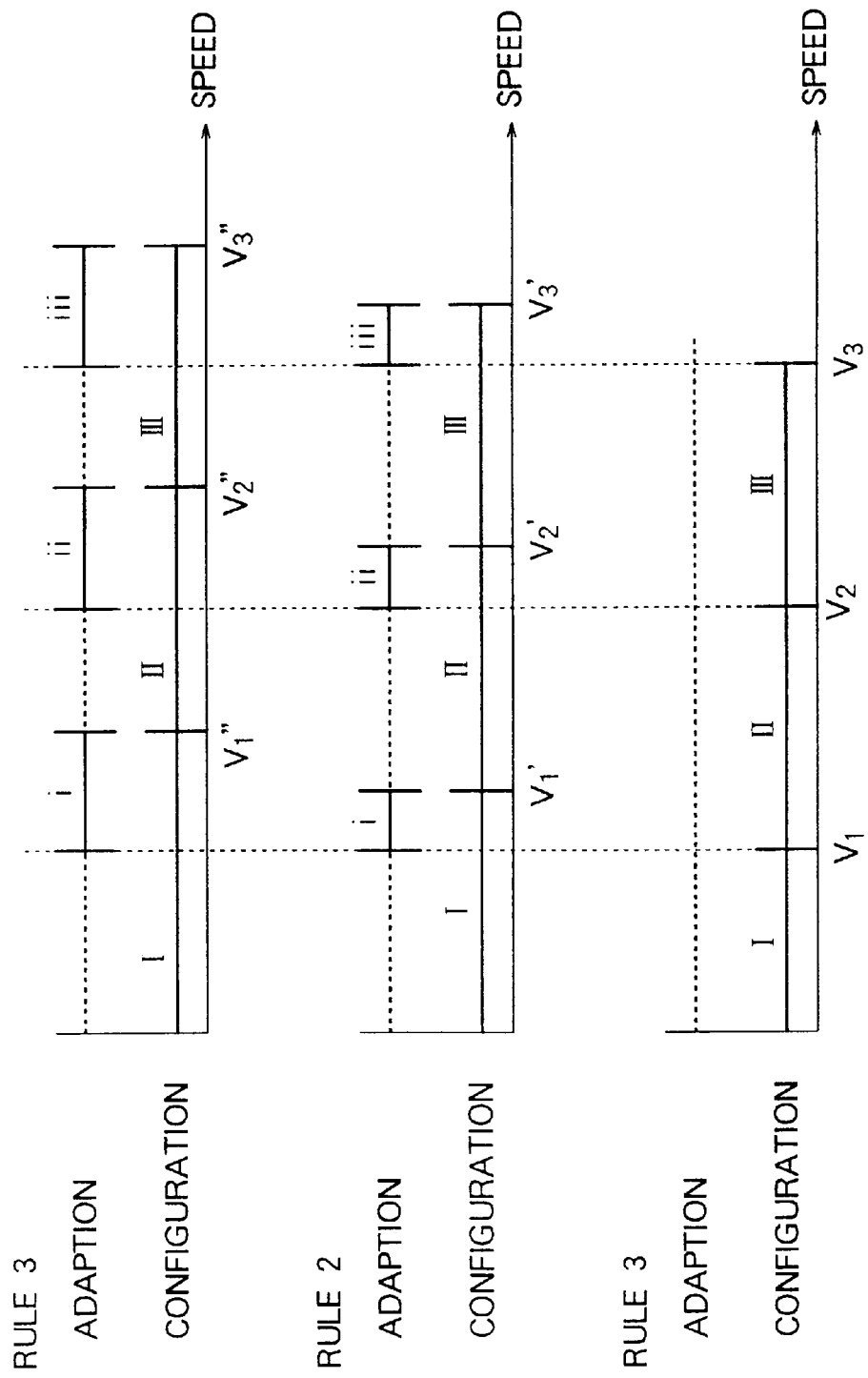

SPREAD-SPECTRUM COMMUNICATION APPARATUS WITH ADAPTIVE FRAME CONFIGURATION

BACKGROUND OF THE INVENTION

The present invention relates to a spread-spectrum packet communication apparatus.

There is currently active research-and-development interest in wireless packet communication systems that employ spread-spectrum technology, more particularly code division multiple access or CDMA technology, to communicate with mobile stations. In typical systems of this type, each packet of data is preceded by transmission of a known reference signal as a header. The receiver uses the header to detect the beginning of the packet, and as a reference signal for coherent demodulation, also referred to as coherent detection. More specifically, the receiver employs the header as a known reference from which to estimate parameters that are then used in phase compensation, or in the weighting of signals received with different delays, thereby overcoming various types of fading. A feature of CDMA systems is that the reference signal can be transmitted with a comparatively high processing gain, to permit more accurate channel estimation, leading to more accurate packet detection and more accurate coherent demodulation.

The term 'packet' will be used below to mean a transmission segment comprising one header followed by payload data. This transmission segment will also be referred to as a transmission frame. A transmission frame must be short enough that channel characteristics do not change significantly over the duration of the frame. Any change that occurs must be small enough to be negligible, or at least small enough to be estimated by simple methods in the receiver. When the receiver is located in a rapidly moving vehicle, such as an automobile traveling at one hundred kilometers per hour, fading is correspondingly fast, and the transmission frame length must be reduced to a value in the range from about half a millisecond (0.5 ms) to about one millisecond (1 ms).

This transmission frame length is much shorter than the data frame length that forms the natural unit of length for error-correcting coding and interleaving. A data frame usually lasts from about ten to about twenty milliseconds (10 ms to 20 ms). Each interleaved data frame must therefore be divided into small packets, and a header must be attached to each packet to create transmission frames with the above length of 0.5 ms to 1 ms.

A problem is that to obtain the benefits of a high processing gain, the header must be at least several symbols long, and sometimes more than ten symbols long. The header alone then occupies a considerable fraction of each packet, typically from about ten percent to about thirty percent, causing an equivalent drop in the rate of data transmission. For communication with slower-moving mobile stations or non-moving stations, this is an unnecessary and undesirable loss of channel efficiency.

SUMMARY OF THE INVENTION

It is accordingly an object of the present invention to enable a spread-spectrum communication apparatus to estimate channel characteristics with necessary accuracy while avoiding unnecessary channel overhead.

The invented spread-spectrum communication apparatus has a transmitter that transmits packets of transmit data preceded by respective reference signals to a distant apparatus, and a receiver that receives similar packets of data and reference signals transmitted from the distant apparatus. The receiver uses the received reference signals in demodulating the received packets of data, and generates information indicative of channel conditions between the spread-spectrum communication apparatus and the distant apparatus.

The spread-spectrum communication apparatus also comprises a control unit that estimates the channel conditions from the information generated by the receiver, and adapts the length of the packets of data transmitted by the transmitter according to the channel conditions. The transmitter may transmit configuration information indicating the packet length.

The receiver may use the received reference signals to calculate a channel estimate, which is then used in demodulating the received packets of data. The channel estimate may also be updated during the reception of the packets of data, by an adaptive algorithm, for example. The updating is preferably enabled and disabled according to the channel conditions estimated by the control unit.

BRIEF DESCRIPTION OF THE DRAWINGS

In the attached drawings:

FIG. 4 illustrates control rules used by the control unit in FIG. 1.

DETAILED DESCRIPTION OF THE INVENTION

An embodiment of the invention will be described with reference to the attached illustrative drawings.

Figure 1:
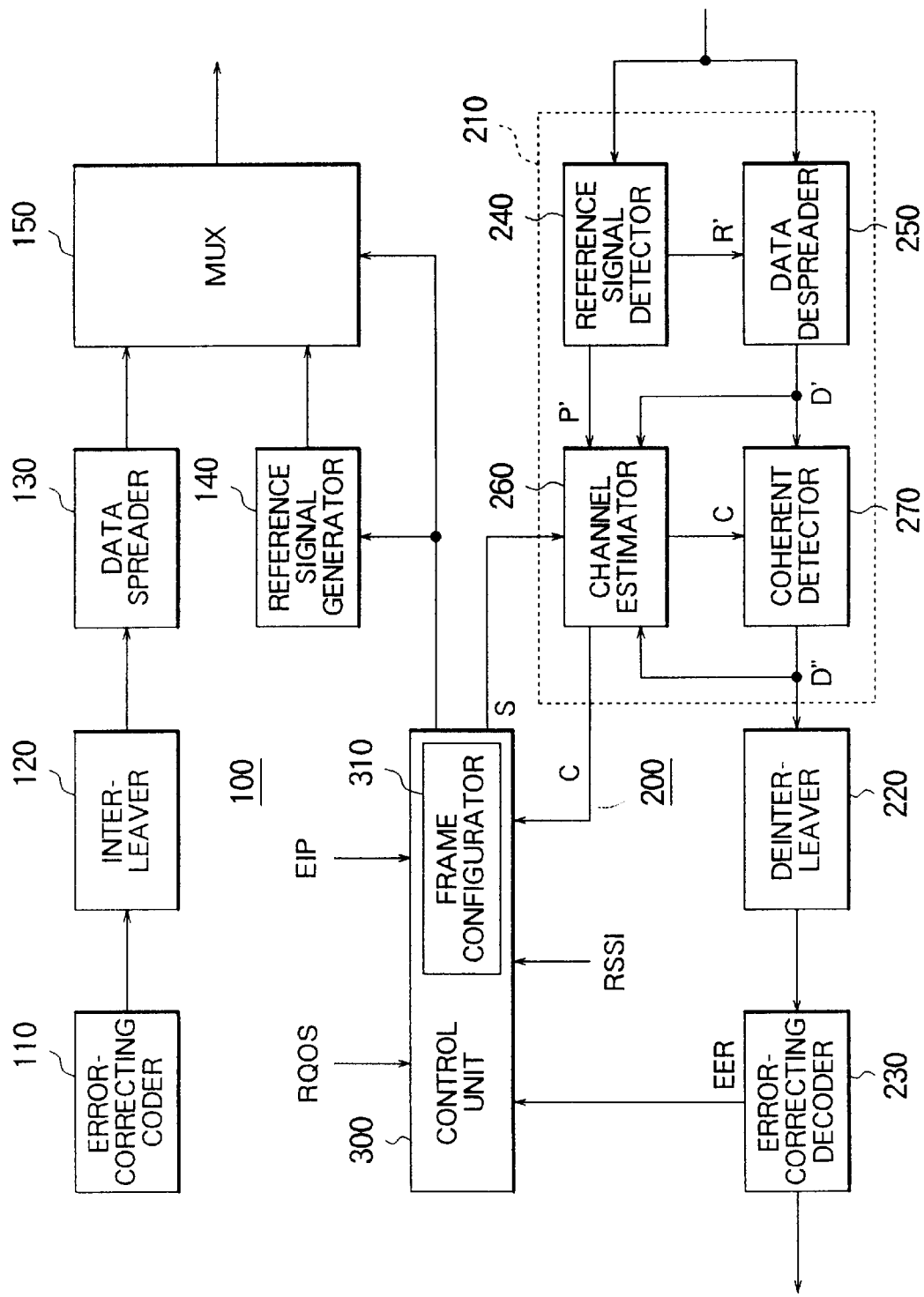
FIG. 1 is a block diagram of the invented spread-spectrum communication apparatus.

Referring to FIG. 1, a spread-spectrum communication apparatus embodying the present invention comprises a transmitter 100, a receiver 200, and a control unit 300. The transmitter 100 transmits to a similar distant communication apparatus, from which the receiver 200 receives signals. The control unit 300 controls the transmitter 100 and receiver 200.

The transmitter 100 comprises an error-correcting coder 110, an interleaver 120, a data spreader 130, a reference signal generator 140, and a multiplexer (MUX) 150. The receiver 200 comprises a demodulator 210, a de-interleaver 220, and an error-correcting decoder 230. The demodulator 210 comprises a reference signal detector 240, a data despreader 250, a channel estimator 260, and a coherent detector 270. The channel estimator 260 has the internal structure shown in FIG. 2, comprising a complex multiplier 261, an averager 262, a register 263, another complex multiplier 264, a subtractor 265, an adapter 266, and a switch 267. The control unit 300 in FIG. 1 has a novel frame configurator 310 that adapts the transmitted frame configuration to channel conditions.

Figure 3:
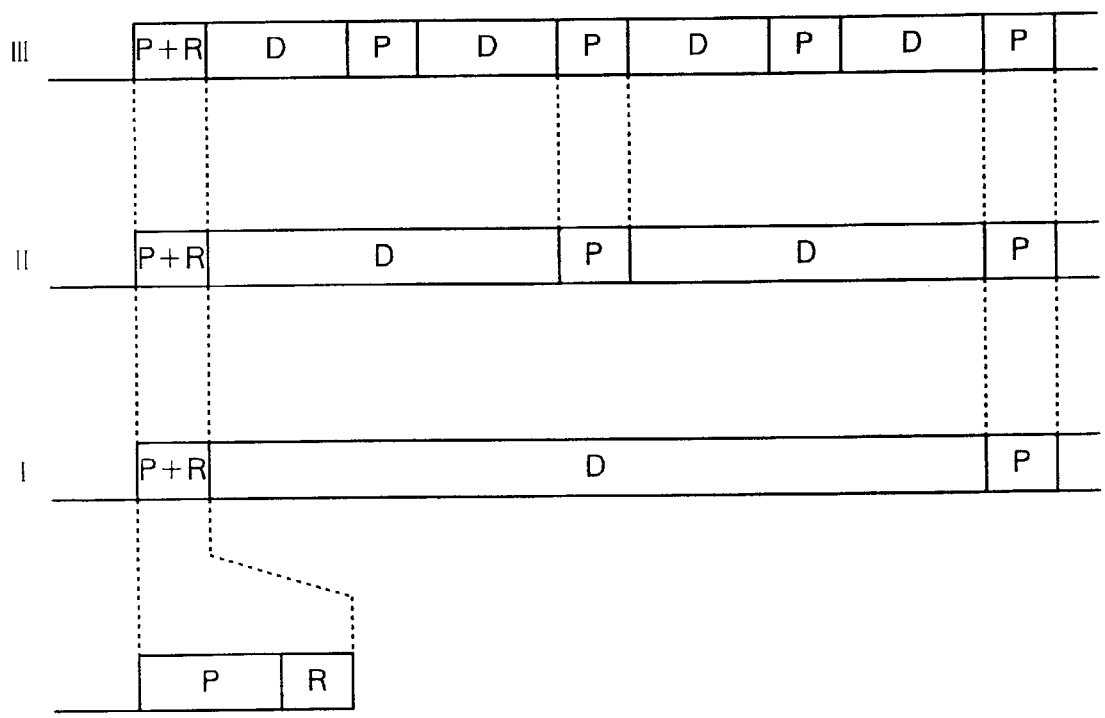
FIG. 3 is a timing diagram illustrating different frame configurations.

The frame configurator 310 controls the transmitter 100 according to three frame configurations, denoted I, II, and III in FIG. 3, switching among these configuration according to channel conditions, as described later. FIG. 3 shows the first part of one data frame in each of the three frame configurations. Normally, frame configuration III is used in communication with a mobile station moving at high speed, frame configuration II is used when the mobile station speed is moving at medium speed, and frame configuration I is used when the mobile station is moving slowly.

In each frame configuration, a transmission frame or packet comprises fixed, known pilot data, denoted by the letter P, and payload data, denoted by the letter D. The first packet in each data frame also includes configuration information, denoted by the letter R. The term 'reference signal' will be used to refer to the combination of the pilot data P and configuration information R at the beginning of the data frame, and each occurrence of the pilot data P in the interior of the data frame.

Configuration II is obtained from configuration III by replacing every second reference signal with payload data. Configuration II thus transmits payload data at a higher rate, with less overhead, the reduction in overhead being equivalent to half of the pilot data P in configuration III. Similarly, configuration I is obtained from configuration II by replacing every second reference signal with payload data, and transmits payload data at a still higher rate, with still less overhead. The reduction in overhead in configuration I is equivalent to half of the pilot data P in configuration II, and three-fourths of the pilot data P in configuration III.

The accuracy of channel estimation in the receiver is determined partly by channel conditions, and partly by the length of the intervals between pilot data P. Shorter intervals lead to more accurate estimation. Accordingly, while configuration I provides the highest rate of data transmission, for given channel conditions, configuration III provides the most accurate channel estimation.

The operation of the spread-spectrum communication apparatus in FIG. 1 will now be described with reference to FIGS. 1, 2, 3, and 4. First, the operation of the transmitter 100 will be described.

Transmit data undergo an encoding process such as a convolutional coding process in the error-correcting coder 110, followed by an interleaving process in the interleaver 120 and a spreading process in the data spreader 130, using a data spreading code generated internally in the data spreader 130. Under control of the frame configurator 310, the reference signal generator 140 generates a reference signal including pilot data P and configuration information R according to one of the frame configurations in FIG. 3, spreading the pilot data P and configuration information R by a reference spreading code. The reference spreading code may differ from the data spreading code, or the same spreading code may be used for both. Different data rates may be used for the pilot data P, configuration information R, and payload data D. The multiplexer 150 multiplexes the signals output by the data spreader 130 and reference signal generator 140 according to the frame configuration specified by the frame configurator 310.

The multiplexed signal output by the multiplexer 150 is up-converted to a radio-frequency band, amplified, and radiated from an antenna. A similar signal transmitted from the distant communication apparatus is received at the antenna, amplified, and down-converted to the baseband frequency. The antenna and circuits that carry out these functions have been omitted to avoid obscuring the invention with irrelevant detail.

Next, the general operation of the receiver 200 will be described.

The demodulator 210 demodulates the received signal and obtains demodulated payload data D", which are supplied to the de-interleaver 220. The de-interleaver 220 de-interleaves the demodulated data D" by performing a process reverse to that performed by the interleaver 120; then the error-correcting decoder 230 decodes the de-interleaved data by performing a process reverse to that performed by the error-correcting coder 110, and outputs the decoded data. The error-correcting decoder 230 calculates an estimated error rate (EER) in the de-interleaved data, and informs the control unit 300.

Next, the internal operation of the demodulator 210 will be described. The received signal input to the demodulator 210 has an in-phase component, which the demodulator 210 treats as the real component of a complex number, and a quadrature component, which the demodulator 210 treats as the imaginary component of the complex number. Complex numbers are also used to represent the channel characteristics estimated by the channel estimator 260, a single complex number C expressing both amplitude attenuation and phase delay.

The reference signal detector 240 in the demodulator 210 comprises means such as a matched filter or a correlator by which the reference signal detector 240 detects the position of the reference signal in the received signal. The reference signal detector 240 thereby infers the frame timing, and supplies timing signals to the data despreader 250, channel estimator 260, and other components of the demodulator 210. The reference signal detector 240 also supplies the received pilot data P' to the channel estimator 260, and the received configuration information R' to the data despreader 250 and control unit 300.

Operating in accordance with the configuration information and timing signals supplied by the reference signal detector 240, the data despreader 250 uses the data spreading code to despread the payload data in the received signal, and supplies the despread data signal D' to the channel estimator 260 and coherent detector 270.

The channel estimator 260 generates a channel estimate C from the received pilot data P'. Due to multipath reception, the channel estimate C normally represents a weighted sum of the phase delays on different paths. The channel estimate C is supplied to the coherent detector 270 and the control unit 300. If so directed by the control unit 300, the channel estimator 260 also updates the channel estimate C during the reception of payload data, using the despread data signal D' output by the data despreader 250 and the demodulated signal D" output by the coherent detector 270. These operations will be described in more detail below.

The coherent detector 270 multiplies the despread data signal D' by the complex conjugate of the channel estimate C to compensate for channel effects, and obtains the demodulated data signal D". This signal is supplied to the channel estimator 260 and the de-interleaver 220.

Next, the internal operation of the channel estimator 260 (FIG. 2) will be described.

The complex multiplier 261 multiplies the received pilot data P' by the complex conjugate P* of the known pilot data P. The averager 262 calculates a mean value of the resulting products, thereby obtaining the channel estimate C, and sets this channel estimate C in the register 263. The channel estimate is supplied from register 263 to the coherent detector 270.

The control unit 300 supplies an updating control signal S that determines whether the channel estimate C is updated adaptively. In its inactive state, the updating control signal S opens the switch 267 and disables the operation of the complex multiplier 264, subtractor 265, and adapter 266. In this state, the channel estimate placed in register 263 by the averager 262 is left unchanged until the next reference signal is received.

In its active state, the updating control signal S closes the switch 267 and enables the complex multiplier 264, subtractor 265, and adapter 266. In this state, during the reception of payload data, the complex multiplier 264 multiplies the demodulated data signal D" obtained from the coherent detector 270 by the channel estimate set in the register 263, and the subtractor 265 subtracts the resulting product from the despread data signal D' obtained from the data despreader 250. The resulting difference is the difference between the despread signal actually received and the despread signal that should have been received if the channel estimate was accurate. The switch 267 uses an adaptive algorithm such as the well-known least mean squares (LMS) or recursive least squares (RLS) algorithm to update the channel estimate, and places the updated channel estimate in the register 263. These updates are made repeatedly until the next reference signal is received.

The control unit 300 decides whether to enable or disable adaptive updating according to some or all of the following factors: a required quality of service (RQOS) that is specified when communication begins; the estimated error rate (EER) reported by the error-correcting decoder 230; the channel estimate (C) reported by the channel estimator 260; a received signal strength indication (RSSI) reported by an additional part of the receiver 200, not shown in the drawing; and an estimated interfering power (EIP) reported by yet another part of the receiver 200 that is not shown in the drawing. Basically, the control unit 300 weighs the required quality of service against the channel conditions.

In the same way, the control unit 300 also decides which of the three frame configurations (I, II, and III) to have the transmitter 100 use.

To simplify the decision process, the control unit 300 can express channel conditions in terms of an equivalent mobile-station speed, lower speeds being equivalent to better channel conditions. The speed can be estimated as, for example, a weighted sum of the estimated error rate EER, the channel estimate C, and the received signal strength indication RSSI. For the frame configuration, the basic control rule is that configuration I is used at low speeds, configuration II at medium speeds, and configuration III at high speeds, as mentioned earlier.

Estimated interfering power is also be taken into consideration, as the required quality of service (RQOS) can be expressed as a signal-to-interference ratio (SIR). The control unit 300 accordingly follows three control rules, as illustrated in FIG. 4. Rule one is employed when a high quality of service is required, and is also employed when high interfering power is present. Rule three is employed when the required quality of service is low and interfering power is low. Rule two is employed in cases intermediate between rules one and three.

Under control rule one, the control unit 300 selects frame configuration I at equivalent speeds up to speed $v_1$, frame configuration II at equivalent speeds from $v_1$ to $v_2$, and frame configuration III at equivalent speeds from $v_2$ to $v_3$, where $v_1$, $v_2$, and $v_3$ are three predetermined boundary speeds, $v_1$ being the lowest and $v_3$ the highest. The frame configurator 310 generates signals that control the reference signal generator 140 and multiplexer 150 so as to insert reference signals at the appropriate intervals. Control signal S is left in its inactive state, so that in the channel estimator 260, switch 267 remains open and the complex multiplier 264, subtractor 265, and adapter 266 do not operate, regardless of the received configuration information R'.

If the equivalent speed is higher than $v_3$, channel conditions do not permit effective communication under control rule one, so a higher control rule is invoked.

Under control rule three, the control unit 300 selects frame configuration I up to a speed $v_1''$, frame configuration II from $v_1''$ up to a speed $v_2''$, and frame configuration III from $v_2''$ up to a speed $v_3''$, where $v_1''$, $v_2''$, and $v_3''$ are predetermined boundary speeds higher than $v_1$, $v_2$, and $v_3$, respectively. The updating control signal S is activated at speeds above $v_1$ if the received configuration information R' indicates configuration I, at speeds above $v_2$ if R' indicates configuration II, and at speeds above $v_3$ if R' indicates configuration III. If the transmitted and received frame configurations are the same, then in the ranges of speeds (i) between $v_1$ and $v_1''$, speeds (ii) between $v_2$ and $v_2''$, and speeds (iii) between $v_3$ and $v_3''$, switch 267 is closed, and the adapter 266 adaptively updates the channel estimates in the register 263.

As the tracking characteristics of the adaptive algorithm employed by the adapter 266 vary depending on the speed range (i, ii, or iii), different control parameters are set for the adaptive algorithm in each range. For example, the step size in the LMS algorithm, or the forgetting coefficient in the RLS algorithm, is set to a different optimal value in each range.

Under control rule three, effective communication becomes impossible at speeds exceeding $v_3''$.

Control rule two is similar to control rule three, with boundary speeds $v_1''$, $v_2''$, and $v_3''$ replaced by lower speeds $v_1'$, $v_2'$, and $v_3'$.

The principle of these control rules is that channel characteristics tend to change at a rate that depends on the speed of the mobile station, and the reliability of the adaptive channel estimates made by the adapter 266 varies depending on the channel conditions in general. Thus increasing equivalent speed demands frame configurations with increasingly short intervals between reference signals, and while adaptive channel estimation can extend the boundary speed up to which a given frame configuration can be usefully employed, adaptive channel estimation has limited reliability. When channel conditions are poor, or when a high quality of service is required, it is better to use a frame configuration with short intervals between reference signals than to rely on adaptive channel estimation.

In selecting among control rules one, two, and three, the control unit 300 is not limited to considering the required quality of service and the estimated interfering power. One or more of the other factors mentioned above (C, EER, and RSSI) may also be used.

By operating according to these control rules, the embodiment described above enables data to be transmitted with optimum efficiency according to channel conditions, without incurring unnecessary channel overhead, but without impairing the accuracy of channel estimation. When the control unit 300 estimates that channel conditions are adverse, the frame configurator 310 reduces the packet length, thereby reducing the intervals between reference signals, so that the channel estimator 260 can obtain accurate channel estimates despite the adverse conditions. When the control unit 300 estimates that channel conditions are favorable, the frame configurator 310 increases the packet length, hence the intervals between reference signals, so that payload data can be transferred more efficiently. Adaptive channel estimation widens the range of conditions under which each frame configuration can be applied, but the control unit 300 avoids using adaptive channel estimation indiscriminately, thereby avoiding the unnecessary use of this function under favorable channel conditions, and the errors that might be caused by the use of this function under adverse channel conditions.

The embodiment described above can be varied in numerous ways, a few of which are briefly outlined below.

Instead of spreading the payload data D only once, the transmitter 100 can employ two spreading codes in succession, one code covering the other. The reference data P and configuration information R can also be spread successively in this way.

Figure 2:
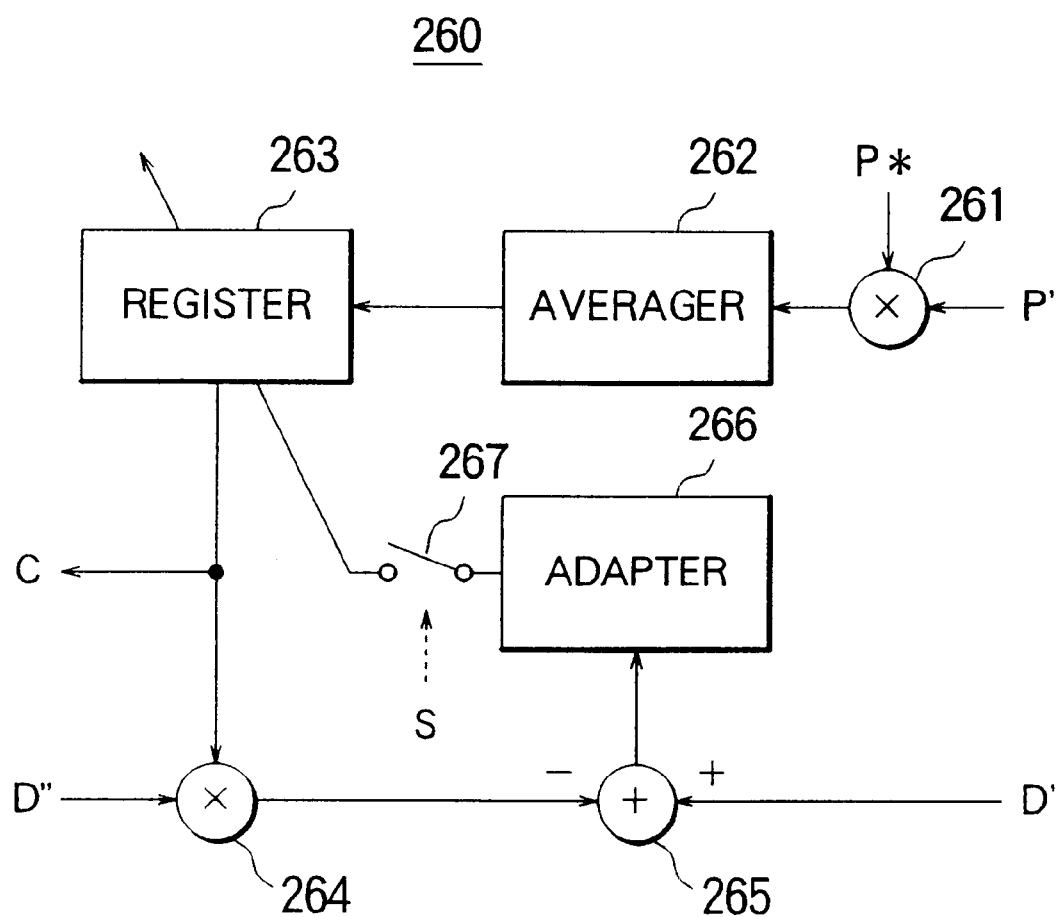
FIG. 2 is a more detailed block diagram of the channel estimator in FIG. 1.

Many other modifications can be made to the transmitter and receiver block configurations shown in FIG. 1, and to the channel estimator configuration shown in FIG. 2.

The invention can be practiced by the use of specialized hardware such as large-scale integrated logic circuits, or by the use of software running on a general-purpose processor such as a microprocessor.

The control rules described above operate independently on the forward link and the reverse link between the two communicating stations, but the two stations can use control information transmitted on the data traffic channels, or on a common control channel, to agree on a single frame configuration for use on both the forward and reverse links. In this case, the receiver 200 always uses the same frame configuration as the transmitter 100. The configuration information R accordingly does not have to be detected by the receiver 200, and can be omitted from the frame configurations shown in FIG. 3.

Alternatively, the frame configuration for both the forward and reverse links can be determined at one of the two communicating stations and transmitted to the other station as shown in FIG. 3, in which case the other station does not have to transmit configuration information.

The control parameters of the adaptive algorithm can be varied within each of the three speed ranges (i, ii, iii) as well as between ranges. Different adaptive algorithms can be used in different speed ranges. Different adaptive algorithms can even be used within the same speed range.

During the reception of payload data, the channel estimates can be adjusted in a non-adaptive manner. Alternatively, the channel estimates can be left fixed throughout each data packet, the control rules being used only to vary the frame configuration.

The number of different frame configurations is not limited to three; the invention can be practiced with more than three frame configurations, or with only two frame configurations. Similarly, the number of control rules is not limited to three.

The invention can be practiced with a RAKE receiver of the type often employed in CDMA systems.

The invention is not limited to wireless systems, and can be applied in one-to-one spread-spectrum systems, as well as in multiple-access systems.

Those skilled in the art will recognize that further variations are possible within the scope claimed below.

What is claimed is:

1. A spread-spectrum communication apparatus, comprising:
   a transmitter transmitting packets of transmit data preceded by respective reference signals to a distant apparatus;
   a receiver receiving similar packets of data and reference signals transmitted from said distant apparatus, using the received reference signals for demodulation of the received packets of data, generating information indicative of channel conditions between said spread-spectrum communication apparatus and said distant apparatus; and
   a control unit coupled to said transmitter and said receiver, estimating said channel conditions from the information generated by said receiver, and varying the length of said packets of transmit data according to said channel conditions;
   wherein the information generated by said receiver comprises a channel estimate used in demodulating said received packets of data;
   wherein said control unit generates an updating control signal having an active state and an inactive state;
   wherein said receiver generates said channel estimate from said reference signals; and
   wherein said receiver updates said channel estimate according to results of demodulating said received packets of data, provided said updating control signal is in said active state.

2. The apparatus of claim 1, wherein said receiver employs an adaptive algorithm to update said channel estimate.

3. A spread-spectrum communication apparatus, comprising:
   a transmitter transmitting packets of transmit data preceded by respective reference signals to a distant apparatus;
   a receiver receiving similar packets of data and reference signals transmitted from said distant apparatus, using the received reference signals for demodulation of the received packets of data, generating information indicative of channel conditions between said spread-spectrum communication apparatus and said distant apparatus; and
   a control unit coupled to said transmitter and said receiver, estimating said channel conditions from the information generated by said receiver, and varying the length of said packets of transmit data according to said channel conditions;
   wherein said control unit estimates said channel conditions by calculating an equivalent speed from the information generated by said receiver, and controls said transmitter by reducing the length of said packets of transmit data as said equivalent speed increases.

4. A method of controlling packet length in a spread-spectrum communication apparatus that transmits packets of transmit data, each preceded by a reference signal, to a distant apparatus, and receives similar packets of data preceded by reference signals from said distant apparatus, comprising the steps of:
   estimating channel conditions between said spread-spectrum communication apparatus and said distant apparatus;
   varying the length of said packets of transmit data according to said channel conditions;
   calculating a channel estimate from the received reference signals;
   using said channel estimate to demodulate said received packets of data;
   generating an update control signal according to said channel conditions, said update control signal having an active state and an inactive state; and
   updating said channel estimate according to said received packets of data, when said update control signal is in said active state.

5. The method of claim 4, wherein said step of updating said channel estimate is carried out by an adaptive algorithm.

6. A method of controlling packet length in a spread-spectrum communication apparatus that transmits packets of transmit data, each preceded by a reference signal, to a distant apparatus, and receives similar packets of data preceded by reference signals from said distant apparatus, comprising the steps of:

calculating a channel estimate from the received reference signals;

using said channel estimate to demodulate the received packets of data;

estimating channel conditions between said spread-spectrum communication apparatus and said distant apparatus; and varying the length of said packets of transmit data according to said channel conditions;

wherein said step of varying the length of said packets of transmit data further comprises the steps of:
calculating an equivalent speed representing said channel conditions; and
reducing the length of said packets of transmit data as said equivalent speed increases.

7. The method of claim 6, wherein said step of calculating an equivalent speed further comprises the steps of:

estimating an error rate in said received packets of data;

measuring a received signal strength of said received packets of data; and calculating said equivalent speed from said channel estimate, said error rate, and said received signal strength.

8. The method of claim 6, wherein said step of reducing the length of said packets further comprises the steps of:

dividing said equivalent speed into a plurality of speed ranges delimited by boundary speeds; and setting the length of said packets of transmit data to a fixed value within each of said speed ranges.

9. The method of claim 8, further comprising the step of:

varying said boundary speeds according to a quality of service required for said packets of transmit data.

10. The method of claim 8, further comprising the steps of:

calculating an estimated interfering power interfering with communication between said spread-spectrum communication apparatus and said distant apparatus; and varying said boundary speeds according to said estimated interfering power.

11. The method of claim 8, further comprising the steps of:

updating said channel estimate during reception of said packets of data from said distant apparatus, if said equivalent speed is in an upper part of each of said speed ranges.

12. The method of claim 11, wherein said step of updating said channel estimate employs an adaptive algorithm.

* * * * *